United States Patent Office 3,005,823
Patented Oct. 24, 1961

3,005,823
5-QUINOLYL METHYLCARBAMATE
Warren W. Kaeding, Concord, Calif., assignor to The Dow Chemical Company, Midland, Mich., a corporation of Delaware
No Drawing. Filed Nov. 12, 1959, Ser. No. 852,185
1 Claim. (Cl. 260—287)

This invention is concerned wtih quinoline compounds and more particularly with 5-quinolyl methylcarbamate having the structure

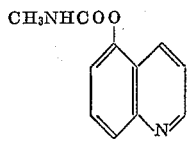

The new compound is a white crystalline solid which is soluble in organic solvents such as methylene chloride, benzene and toluene and is substantially insoluble in solvents such as water, hexane and pentane. This compound is valuable as an active constituent of parasiticidal compositions and is adapted to be employed for the control of microorganisms, insects, aphids and mites.

The new compound may be prepared by intimately mixing together methyl isocyanate and 5-hydroxyquinoline having the formula

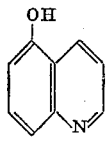

The reactants may be brought together in an inert organic solvent such as benzene, toluene and dimethyl formamide. The amounts of the reactants employed are not critical, some of the desired product being obtained when any proportion of the reactants is employed. Good results are obtained when substantially equimolar proportions of 5-hydroxyquinoline and methyl isocyanate are used. It is usually desirable to employ a small amount of a tertiary amine as catalyst to hasten the carbamylation reaction. Particularly suitable are tertiary alkylamines such as triethylamine and trimethylamine. The reaction takes place smoothly at a temperature in the range of from 15° to 50° C. The time required for the reaction to take place is from about 2 hours to about 50 hours. After completion of the reaction, the product may be recovered from the reaction mixture by adding a solvent such as hexane or pentane or by removing the solvent under reduced pressure and recovering the desired product as residue. The product may then be recovered by conventional procedures such as filtration, washing and/or recrystallization.

In a preferred method for carrying out the reaction, the 5-hydroxyquinoline, methyl isocyanate and triethylamine catalyst are mixed together in an inert solvent with stirring at a temperature of from about 15° to 50° C. and allowed to remain in that temperature range from about 2 to 50 hours. Following the reaction, the product is separated and purified as previously described.

The following example illustrates the invention but is not to be construed as limiting.

Example.—5-quinolyl methylcarbamate

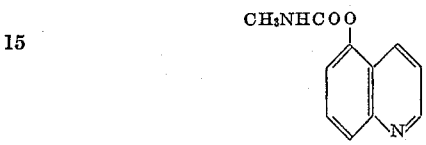

2 milliliters (2 grams; .035 mole) of methyl isocyanate and a few drops of triethylamine catalyst were added to 2.5 grams (.0172 mole) of 5-hydroxyquinoline in 10 milliliters of dimethyl formamide. The resulting mixture was allowed to stand for 48 hours at room temperature and the solvent thereafter removed by vacuum distillation to recover the desired 5-quinolyl methylcarbamate product as residue. The latter was a crystalline solid melting at 115°–116° C. The product had a nitrogen content of 13.73 percent. The theoretical value is 13.86 percent.

5-quinolyl methylcarbamate is useful as a parasiticide particularly for the control of household pests and plant-infesting mites.

In a representative operation as an insecticide, complete controls of house flies (*Musca domestica*) were obtained when the flies were contacted with an aqueous dispersion containing 0.12 gram of 5-quinolyl methylcarbamate in 100 milliliters of ultimate mixture.

In a representative operation for the control of plant-infesting mites (*Tetranychus bimaculatus*), 100 percent controls were obtained when mite-infested plants were sprayed with an aqueous dispersion containing 0.12 gram of 5-quinolyl methylcarbamate in 100 milliliters of aqueous dispersion.

I claim:
5-quinolyl methylcarbamate.

References Cited in the file of this patent

Haworth et al.: J. Chem. Society (London), pages 184–186 (1947).
Leffler et al.: J. American Chemical Society, vol. 70, pages 3439–3442 (1948).